Patented Sept. 6, 1938

2,128,894

UNITED STATES PATENT OFFICE 2,128,894

METHOD OF MAKING CORK COMPOSITION AND PRODUCT PRODUCED THEREBY

Samuel C. Bond, Holly Oak, Del., assignor to Bond Manufacturing Corporation, Inc., a corporation of Delaware No Drawing. Application December 9, 1935, Serial No. 53,671

20 Claims. (Cl. 18—48)

My invention relates to a method of making cork composition made of comminuted cork bonded by a synthetic resin binder, and more particularly to the production of such a cork composition having superior resiliency and other physical properties excelling those of cork composition products available before my invention.

Cork composition is quite widely used in situations which make it desirable that the composition shall be highly resilient and that such resiliency shall be preserved for long periods of time even under conditions of exposure to the atmosphere or other influences. For example, the use of cork composition as expansion joints for concrete roadways and floors requires that the product shall be resilient and shall retain its resiliency for long periods. Cork composition is also put to use as sealing discs for bottles and other containers in connection with the well-known crown caps. For such use it is highly desirable that the cork composition shall be inert, so as not to be affected by the contents of the container or transmit an odor or taste thereto and taint the same. In this situation it is also highly desirable that the cork composition shall possess the resiliency and other physical characteristics of the best grades of properly processed natural cork.

It is one of the principal objects of my invention to provide a cork composition having the resiliency of the best grades of processed natural cork and at the same time bonded with a synthetic resin binder that is not readily attacked by acids or other disintegrating agents. It is a further object of my invention to provide a method whereby, if desired, the composition and the condensation of the synthetic resin binder is so controlled as to produce a resilient cork composition the binder constituent of which is free from odor or taste such as will impart odor or taste to a liquid with which the composition may be caused to contact. A further object of my invention is to provide a cork composition that is highly resistant to the formation of mold, so that it can be used in warm, damp climates or shipped by water without danger of molding.

Various binders have been used and others proposed for use in binding comminuted cork for making cork compositions for many purposes. Among those most generally used in the prior art is the glue-glycerine type of binder which suffers from the disadvantage that it is water soluble and even when treated to render it water resistant it, nevertheless, absorbs some water and tends to disintegrate when exposed to water and subjected to mechanical stress. Moreover, it lacks resistance to acids.

It has also been proposed to use phenol-aldehyde condensation resins and binders, but cork compositions made with the use of such resins before my invention have suffered from one or both of the following drawbacks: (1) The tendency of the phenol-aldehyde condensation resin to impart taste and odor to liquids with which it may happen to contact, particularly those liquids intended to be used as beverages; and (2) lack of resiliency. Phenol-aldehyde condensation resins are known to lack resiliency and, therefore, it was not to be expected that their use as binders for comminuted cork would produce a resilient product. I have found that by following the procedures hereinafter outlined it is possible to overcome these seeming obstacles in the way of utilization of such synthetic resins in producing cork compositions.

More particularly, I have found that the undesirable odor and taste imparted by such resin binders is attributable to the presence of free phenol usually present in the final resin product, and that by appropriate selection of the proportions and kinds of reagents and by control of the condensation it is possible to produce a resin binder in which the phenol constituent has been converted or combined, so that the final composition contains no trace of free uncombined phenol. The phenolic condensation product possessing such desired properties, and which is used in practicing one form of my invention, may be produced by selecting the reagents and controlling their reactions in the manner hereinafter described.

I have also found that the production of useful cork composition products with the use of synthetic resin binders may be facilitated by incorporating the binder with comminuted cork with the former brought only to an intermediate stage of condensation or other reaction, and thereafter completing the condensation or other further reactions, for example, in the course of or after the molding or other forming operation. By so doing, the cork particles at the end of the preliminary mixing or coating step are substantially free flowing and do not stick together in an agglomerated mass thus facilitating their handling and feeding to the molds or to an extrusion machine for the final forming operation. At the same time by deferring the final condensation or other further reaction until the coated cork particles have been intimately pressed together in the molding or other forming operation, it is insured that the bonding of the particles together to form a cohesive product is made more perfect than would be the case were the binder reactions completed at an earlier stage of the process.

I have also found that the resiliency of the final product is improved by incorporating a suitable softening agent with the cork at a convenient stage in the process, and more particularly when added at the same time and as a part of the operation of mixing the cork and the partially condensed synthetic resin. To be more specific, I have found that the tendency of the synthetic binder to produce a rigid, non-resilient product may be overcome to a satisfactory degree by more widely and evenly distributing the resin over and among the cork particles. I have found that this distribution of the resin can be effected and at the same time the resiliency of the cork particles can be enhanced by incorporating with the resin binder or with the materials used in producing the same, an agent which serves to perform certain useful functions in connection with the application of the condensation products to the cork particles and which, under the conditions that prevail in the final cork molding and resin-hardening stages of the process, is absorbed by and serves to soften the cork particles, in this way improving the resiliency of the cork composition produced.

I will now describe, by way of example, an application of my method in producing an odorless, tasteless and acid-resistant cork composition. Thirteen parts by weight of phenol, $C_6H_5OH$, 8 parts by weight of paraformaldehyde, $(CH_2O)_x$, and 30 parts by weight of diethylene glycol, $(CH_2OH.CH_2)_2O$, are mixed in a copper-jacketed kettle provided with suitable stirring apparatus and heated to about 210° F. When that temperature has been reached, 6.4 parts by weight of a 16% solution of sodium hydroxide, NaOH, is added as a catalyst. The heating of the mixture is continued, at a temperature of about 210° F., until a sample of the liquid taken off will set in ten minutes in boiling water. Then the reaction is interrupted and the intermediate product, in admixture with the diethylene glycol and forming therewith a heavy liquid, is immediately mixed with cork in the proportion of about 80 pounds of the liquid and 150 pounds of cork particles. These proportions may be varied somewhat within the range bounded on the one hand by that proportion of resin that will just insure the binding of the cork particles into a cohesive mass, and on the other hand by that proportion of resin which will when distributed over the surfaces of the cork particles begin substantially to lower or interfere with the resiliency of the cork particles. I have found that when using a phenol-aldehyde resin binder the proportion of the binder should be kept well below 40% by weight of the total weight of the cork composition. It will also be understood that the proportion of phenol and paraformaldehyde may be varied somewhat so long as sufficient paraformaldehyde is provided to insure that all of the phenol is reacted. Similarly the proportion of the catalyst may be varied according to circumstances.

The comminuted cork, which has been treated as above described, is then taken to the extrusion machines, for instance, such a machine as shown in Patent No. 1,453,617, issued May 1, 1923. In such machines, the comminuted cork thus treated is confined in a mold at a temperature of about 300° F., which completes the reaction and causes the comminuted cork to be agglomerated by the binder into a cohesive mass of the shape desired.

In preparing a phenol-aldehyde condensation resin for use in the binder, I have found that the most desirable results are obtained by the use of paraformaldehyde in considerable excess. This takes up thoroughly all of the phenol, and converts it, and any excess of paraformaldehyde, remaining in the finished product, being volatile, is dissipated. Furthermore, it is likely that a certain amount of this ingredient is converted into another polymer known as formose. Paraformaldehyde, which is a solid at temperatures below about 248° F., is used, partly, on account of the simplicity of the operation forming the primary condensation product, partly, because there is no water to be eliminated except that of the reaction, and partly, because an excess of this material can be retained to assure complete conversion. At any rate, I have found when using a phenol-aldehyde resin as the binder that the use of paraformaldehyde is very important in securing a finished product which is free from odor and taste and at the same time does not cause discoloration of the cork.

In place of paraformaldehyde other methylene-yielding substances that do not objectionably volatilize and pass off at temperatures at or below those maintained in the final cork molding and resin-hardening stages of the process, may be used in preparing a finished product free from odor and taste. For example, a hexamethylenetetramine may be used when the product is intended to be used in situations where it is not important that the cork be kept free from discoloration. The odorless and tasteless product may also be produced by using an ordinary formaldehyde solution for supplying the aldehyde constituent in the first stage of the phenolic resin condensation and thereafter adding an additional aldehydic or methylene-yielding substance, such for example as paraformaldehyde or hexamethylenetetramine, in amount sufficient to insure an excess in the final condensation stage sufficient to react with all of the phenol present.

In the specific example above set forth, the diethylene glycol is used to soften the cork and as a solvent for the intermediate products of condensation. It furnishes bulk to enable the resin to spread over the enormous surfaces of the cork particles. Up to the time the condensation is interrupted it serves to dilute the reacting materials and allow the conversion reactions to proceed smoothly. It takes little or no part in the conversion reactions and during the final condensation stage is rejected from the binder and absorbed by the cork particles. The amount of this material used should not substantially exceed the amount the cork will absorb and may, as in the example given above, be somewhat less. The boiling point, hygroscopic properties and vapor tension of this material are such that the cork treated with it will retain the properties imparted to it for a long time.

It is to be understood that other softening agents may be used provided they are miscible with the partially condensed resin and capable of facilitating its distribution over the surfaces of the cork particles, and at the same time are absorbed by the cork particles in the course of the molding and resin-hardening stages of the process. Other softening agents that I have used successfully are glycerine, ethylene glycol and triethylene glycol.

As hereinbefore stated, the proportion of softening agent used should not exceed that which may be absorbed by the cork particles. Depending upon the size of the cork particles, the percentage limits of softening agent will in general vary from about 11% to 20% by weight. The smaller the size of the cork particles the more softening agent will be required to make a product of the same degree of resiliency. When the composition is to be used for sealing purposes, the amount of the softening agent should be adequate to insure that the composition will remain flexible and resilient in relatively dry atmospheres, say, atmospheres having a humidity as low as 20%. Hard, brittle compositions are liable to leak when used as the sealing medium in crown caps where pressure or vacuum sealing is intended.

If desired, the procedure above outlined may be modified by adding the diethylene glycol, or other softening agent employed, after the intermediate condensation of the synthetic resin has been effected. The softening agent is thus permitted to perform its functions of diluting the intermediate condensation product, thereby promoting its distribution over the surfaces of the cork particles and at the same time being itself absorbed into the cork.

When the binder is to be made of a phenolaldehyde or a similar phenolic condensation resin, it is preferred to use an alkaline catalyst for effecting the condensation of the phenol and aldehyde or other methylene-yielding substance, and of the alkaline catalysts it is preferred to use sodium hydroxide. The cork structure is practically all fatty acid and, while the intermediate product which is applied to the cork is strongly alkaline, the finished cork composition product is acid. This is believed to be due to the neutralization of the alkalinity of the binder by a part of the fatty acid of the cork. However, the use of acid catalysts is not to be excluded, particularly when the cork composition is to be used in situations where it is immaterial whether or not the cork is discolored.

The cork composition made in accordance with the modification of the process exemplified by the hereinbefore described specific example is odorless, tasteless and acid-resistant and, therefore, forms a highly desirable material for use in crown caps and seals. Furthermore, it is highly resistant to the formation of mold, so that it can be used in warm, damp climates, or shipped by water, without danger of molding. This finished product does not melt or soften by heat and is insoluble in all usual solvents. Alkalis attack it by destroying both the cork and binder.

While the invention has been described with particular reference to the use of a phenol-aldehyde resin as the binder, it is to be understood that other synthetic resins may be employed, particularly those that are compatible with the cork and that may be applied in a partially reacted or condensed state and thereafter further reacted or condensed in the presence of cork particles. For example, the urea-aldehyde resins may be used.

It is to be understood that the process in its broader aspects is not limited to the production of an odorless and tasteless product. For some purposes, for example, when used for expansion joints in concrete roadways it is immaterial whether the product be free from odor and taste. However, in such situations it is important that the product possess high resiliency and be resistant to atmospheric and other disintegrating influences. In producing the product for such purposes it is not essential that paraformaldehyde or a similar aldehyde or methylene-yielding compound be used in effecting the condensation; nor is it necessary that an excess of such aldehydic substance be provided. However, it is important that a softening agent of the type hereinbefore stated be used in the manner and for the purposes described.

It will be understood that various changes may be made in the details and in the proportions and kinds of the materials employed without departing from the invention, which is not to be deemed as limited other than as indicated in the appended claims.

The term "normally liquid polyhydric alcohol" as used in the claims is intended to mean those polyhydric alcohols that are liquid at room temperature under atmospheric pressure.

This is a continuation in part of my co-pending application Serial No. 422,664, filed January 22, 1930.

I claim:

1. The method of making a resilient cork composition which comprises mixing comminuted cork with a partially reacted thermo-setting synthetic resin and an effective amount of a compatible cork softening agent, molding the composition so formed and completing the reaction to produce a resilient, molded cork composition body.

2. The method of making a resilient cork composition which comprises forming a mixture of a partially condensed thermo-setting synthetic resin and an effective amount of a compatible cork softening agent, mixing the same with comminuted cork, molding the composition so formed and heating to complete the condensation reactions and equalization of the softening agent within the cork, thereby producing a resilient, molded cork composition body.

3. The method of making a resilient cork composition which comprises treating comminuted cork with an effective amount of a compatible cork softening agent, applying a partially condensed thermo-setting synthetic resin to said comminuted cork, and thereafter molding and heating the composition so formed to complete the condensation reactions and equalization of the softening agent within the cork, thereby producing a resilient, molded cork composition body.

4. The method of making a resilient cork composition which comprises forming a mixture of a partially condensed phenol-aldehyde resin and a normally liquid polyhydric alcohol, the proportion of the polyhydric alcohol being within the absorbent capacity of the cork composition, that is being produced and sufficient to soften the cork particles in said composition mixing the same with comminuted cork, molding and heating the composition so formed to complete the condensation reactions and equalization of the polyhydric alcohol within the cork, thereby producing a resilient, molded cork composition body.

5. The method of making a resilient cork composition which comprises forming a mixture of a partially condensed thermo-setting synthetic resin and a glycol, the proportion of the glycol being within the absorbent capacity of the cork composition that is being produced and sufficient to soften the cork particles in said composition mixing said mixture with comminuted cork, molding the cork composition so formed and heating to complete the condensation reactions and to cause said glycol to be absorbed by said cork particles, thereby producing a resilient, molded cork composition body.

6. The method of making a resilient cork composition which comprises forming a mixture of a partially condensed thermo-setting synthetic resin and diethylene glycol, the proportion of diethylene glycol being within the absorbent capacity of the cork composition that is being produced and sufficient to soften the cork particles in said composition mixing said mixture with comminuted cork, heating and molding the cork composition so formed to complete the condensation reactions and to cause said diethylene glycol to be absorbed by said cork particles, thereby producing a resilient, molded cork composition body.

7. The method of making a highly resilient, substantially odorless, tasteless and acid-resistant cork composition which comprises reacting a mixture of a phenol and a methylene-yielding substance to form a partially condensed phenolic resin, mixing cork in comminuted form with the thus formed product and with an effective amount of a compatible cork softening agent, heating and molding the thus provided cork mixture, and maintaining an excess of said methylene-yielding substance until conversion of all of the phenol is completed, thereby producing a resilient, molded cork composition body.

8. The method of making a highly resilient, acid-resistant, substantially odorless and tasteless cork composition comprising heating a mixture of phenol and paraformaldehyde in the presence of an alkaline catalyst to initiate condensation reactions and continuing the heating until the product has been brought to an intermediate stage of conversion such that a heavy liquid product is produced, mixing the thus formed product with cork in comminuted form, treating the cork with a cork softening agent compatible with said phenolic condensation product, heating and molding the thus provided cork mixture, and maintaining an excess of paraformaldehyde until conversion of all of the phenol is completed.

9. The method of making an odorless, tasteless, and acid-resistant cork composition comprising heating a mixture of phenol and paraformaldehyde in the presence of a catalyst to initiate condensation reactions and continuing the heating until the product has been brought to an intermediate stage of conversion such that a heavy liquid product is produced, mixing the thus formed product with cork in comminuted form, hot molding the thus provided cork mixture, and maintaining an excess of paraformaldehyde until conversion of all of the phenol is completed.

10. The method of making an odorless, tasteless, and acid-resistant cork composition comprising heating a mixture of phenol and paraformaldehyde in the presence of an alkaline catalyst to initiate condensation reactions and continuing the heating until the product has been brought to an intermediate stage of conversion such that a heavy liquid product is produced, mixing the thus formed product while in admixture with diethylene glycol with cork in comminuted form, heating and molding the thus provided cork mixture, and maintaining an excess of paraformaldehyde until conversion of all of the phenol is completed.

11. The method of making an odorless, tasteless, and acid-resistant cork composition comprising heating a mixture of phenol, paraformaldehyde, and an amount of diethylene glycol within the absorbent capacity of the cork composition that is being produced in the presence of a catalyst to initiate condensation reactions between the phenol and the paraformaldehyde and continuing the heating until the product has been brought to an intermediate stage of conversion such that a heavy liquid product miscible with the diethylene glycol is produced, mixing the said product while associated with said glycol with cork in comminuted form, heating and molding the cork mixture thus formed to complete the condensation reactions, and to cause the glycol to separate from the condensation product and to be absorbed by said cork particles, and maintaining an excess of paraformaldehyde until conversion of all of the phenol is completed.

12. The method of making an odorless, tasteless, and acid-resistant cork composition comprising heating a mixture of phenol, paraformaldehyde, and an amount of diethylene glycol within the absorbent capacity of the cork composition that is being produced in the presence of an alkaline catalyst to initiate condensation reactions between the phenol and the paraformaldehyde and continuing the heating until the product has been brought to an intermediate stage of conversion such that a heavy liquid product miscible with the diethylene glycol is produced, mixing the said product while associated with said glycol with cork in comminuted form, heating and molding the cork mixture thus formed to complete the condensation reactions and to cause the glycol to separate from the condensation product and to be absorbed by said cork particles, maintaining an excess of paraformaldehyde until conversion of all of the phenol is completed and driving off as a gas uncombined paraformaldehyde present upon completion of the conversion, to provide a final product substantially free from uncombined formaldehyde.

13. The method of making a resilient cork composition which comprises diluting a partially condensed thermo-setting synthetic resin with a compatible cork softening agent, the proportion of the softening agent being within the absorbent capacity of the cork composition that is being produced and sufficient to soften the cork particles, in said composition, mixing said mixture with comminuted cork, heating and molding the cork mixture so formed to complete the condensation reactions and to cause said softening agent to be absorbed by said cork particles, thereby producing a resilient, molded cork composition body.

14. A cork composition having a resiliency at least substantially equal to that of processed natural cork and comprising cork particles that have been softened by absorption therein of a softening agent and are agglomerated into a coherent mass by an acid-resistant, substantially odorless and tasteless phenolic condensation product as a binder.

15. An acid-resistant, substantially odorless and tasteless, cork composition having a resiliency at least substantially equal to that of processed natural cork and being especially adapted for use in gaskets for sealing containers for food and other easily contaminated substances, said composition comprising cork particles that have been softened by absorption therein of a softening agent and are agglomerated into a coherent mass by a binder consisting of a substantially anhydrous phenol-formaldehyde condensation product free from uncombined phenol.

16. An acid-resistant, and substantially odorless and tasteless cork composition having a resiliency at least substantially equal to that of processed natural cork and being especially adapted for use in gaskets for sealing containers for food and other easily contaminated substances comprising comminuted cork, the particles of which are coated and bound together into a coherent homogeneous mass by thin coatings consisting of a substantially anhydrous phenol-formaldehyde condensation resin substantially free from uncombined phenol, said cork and resin being present in about the proportions of 22 parts of resin to 150 parts of cork both by weight.

17. A highly resilient, odorless, tasteless, and acid-resistant cork composition comprising comminuted cork, the particles of which have been softened by absorption therein of diethylene glycol and are coated and bound together into a coherent homogeneous mass by thin coatings consisting of a substantially anhydrous phenol-formaldehyde condensation resin free from uncombined phenol.

18. A composition of matter comprising granulated cork and a binder composed of an artificial resin in solution in a compatible cork-softening agent, in proportions to produce an article adapted for use as a sealing material and having such tensile strength and resiliency that under sealing pressures there is no tendency for cracking or disintegration.

19. A composition of matter comprising granulated cork and a binder composed principally of a phenol aldehyde resin in solution in a compatible cork-softening agent in proportions to produce an article adapted for use as a sealing material and having such tensile strength and resiliency that under sealing pressures there is no tendecy for cracking or disintegration.

20. A composition of matter comprising granulated cork and a binder composed principally of a phenol aldehyde resin in solution in a normally liquid polyhydric alcohol in proportions to produce an article adapted for use as a sealing material and having such tensile strength and resiliency that under sealing pressures there is no tendency for cracking or disintegration.

SAMUEL C. BOND.